United States Patent
Hirawady et al.

(10) Patent No.: US 11,055,362 B2
(45) Date of Patent: *Jul. 6, 2021

(54) DOCUMENT DISTRIBUTION IN A GRAPH DATABASE

(71) Applicant: ADP, LLC, Roseland, NJ (US)

(72) Inventors: Michael Hirawady, Florham Park, NJ (US); Jason F. Melo, Hastings-on-Hudson, NY (US)

(73) Assignee: ADP, LLC, Roseland, NJ (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/955,600

(22) Filed: Apr. 17, 2018

(65) Prior Publication Data

US 2019/0318005 A1    Oct. 17, 2019

(51) Int. Cl.
| | | |
|---|---|---|
| *G06F 16/93* | (2019.01) | |
| *G06F 16/335* | (2019.01) | |
| *G06F 16/907* | (2019.01) | |
| *G06F 16/901* | (2019.01) | |

(52) U.S. Cl.
CPC ............ *G06F 16/93* (2019.01); *G06F 16/335* (2019.01); *G06F 16/907* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 7,117,165 B1 | 10/2006 | Adams et al. | |
| 8,504,653 B1* | 8/2013 | Commons | H04L 67/1097 709/217 |
| 10,235,533 B1* | 3/2019 | Thoren | G06F 21/6218 |
| 10,353,686 B1 | 7/2019 | Pasha et al. | |
| 2002/0161766 A1 | 10/2002 | Lawson et al. | |
| 2008/0098484 A1 | 4/2008 | Cicchitto et al. | |
| 2009/0320088 A1 | 12/2009 | Gill et al. | |
| 2012/0166323 A1 | 6/2012 | Guo | |
| 2014/0250062 A1* | 9/2014 | Vroom | G06F 16/252 707/618 |
| 2016/0057151 A1* | 2/2016 | Brock | H04L 67/02 726/4 |
| 2016/0110412 A1* | 4/2016 | Sun | G06F 16/248 707/769 |

(Continued)

OTHER PUBLICATIONS

Office Action, dated Dec. 11, 2020, regarding U.S. Appl. No. 15/955,092, 24 pages.

(Continued)

*Primary Examiner* — Mark D Featherstone
*Assistant Examiner* — Samuel C Sharpless, III
(74) *Attorney, Agent, or Firm* — Yee & Associates, P.C.

(57) ABSTRACT

A computer-implemented method of improving data distribution in an organization by a computer, comprises: receiving, by the computer, a command to distribute the document to the organization; responsive to receiving the command, reading a data scoping object assigned to the document; responsive to reading the data scoping object, creating a list of individuals in accordance with the data scoping object; and responsive to creating the list, automatically distributing, by the computer, the document only to the individuals on the list.

20 Claims, 9 Drawing Sheets

(56) References Cited

U.S. PATENT DOCUMENTS

| | | | |
|---|---|---|---|
| 2016/0203327 A1* | 7/2016 | Akkiraju | G06F 21/6218 |
| | | | 707/785 |
| 2016/0371352 A1* | 12/2016 | Kohlmeier | G06F 16/9024 |
| 2018/0239959 A1 | 8/2018 | Bui et al. | |
| 2019/0057064 A1 | 2/2019 | Bonk et al. | |
| 2019/0095446 A1* | 3/2019 | Laeuchli | G06F 16/9024 |
| 2019/0287106 A1 | 9/2019 | Sadeddin et al. | |
| 2019/0317819 A1 | 10/2019 | Brown | |
| 2019/0318068 A1 | 10/2019 | Melo et al. | |

OTHER PUBLICATIONS

Final Office Action regarding U.S. Appl. No. 15/955,562, dated Apr. 22, 2020; 22 pages.

Notice of Allowance regarding U.S. Appl. No. 15/955,562, dated Aug. 11, 2020; 13 pages.

Office Action regarding U.S. Appl. No. 15/955,092, dated May 29, 2020, 36 pages.

Final Office Action regarding U.S. Appl. No. 15/955,092, dated Sep. 16, 2020, 19 pages.

Notice of Allowance regarding U.S. Appl. No. 15/955,092, dated Feb. 25, 2021, 12 pages.

* cited by examiner

US 11,055,362 B2

DOCUMENT DISTRIBUTION IN A GRAPH DATABASE

BACKGROUND INFORMATION

1. Field

The present disclosure relates to computer-implemented document distribution in an organization using graph databases, and in particular to distributing documents based on a list generated from a graph database using a data scoping object linked with the document.

2. Background

As used herein, databases store information exclusively in computers. A graph database is a specific type of database. A graph database has a graph structure including nodes, edges, and properties which represent and store data. Nodes store data. Properties are information that relate to nodes. Edges represent relationships among nodes; that is, edges directly relate nodes to each other. Graph databases, by design, allow for retrieval of complex hierarchical structures.

Organizations have large amounts of data to distribute to employees. Distributing each item of information to each employee can be both costly and counterproductive. For example, distributing information in an organization to people who do not need the information is wasteful. Moreover, distributing information to people who do not want the information is inefficient.

Therefore, it would be desirable to have a method and apparatus that takes into account at least some of the issues discussed above, as well as other possible issues. For example, it would be desirable to have a method and apparatus that overcame the technical problem of distributing information to people who neither need nor want the information.

SUMMARY

The illustrative embodiments provide for a computer-implemented method of improving data distribution in an organization by a computer, the method comprising: receiving, by the computer, a command to distribute the document to the organization; responsive to receiving the command, reading a data scoping object assigned to the document; responsive to reading the data scoping object, creating a list of individuals in accordance with the data scoping object; and responsive to creating the list, automatically distributing, by the computer, the document only to the individuals on the list.

The illustrative embodiments also contemplate a computer configured to execute program code which implements this method. The illustrative embodiments also contemplate a non-transitory computer recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
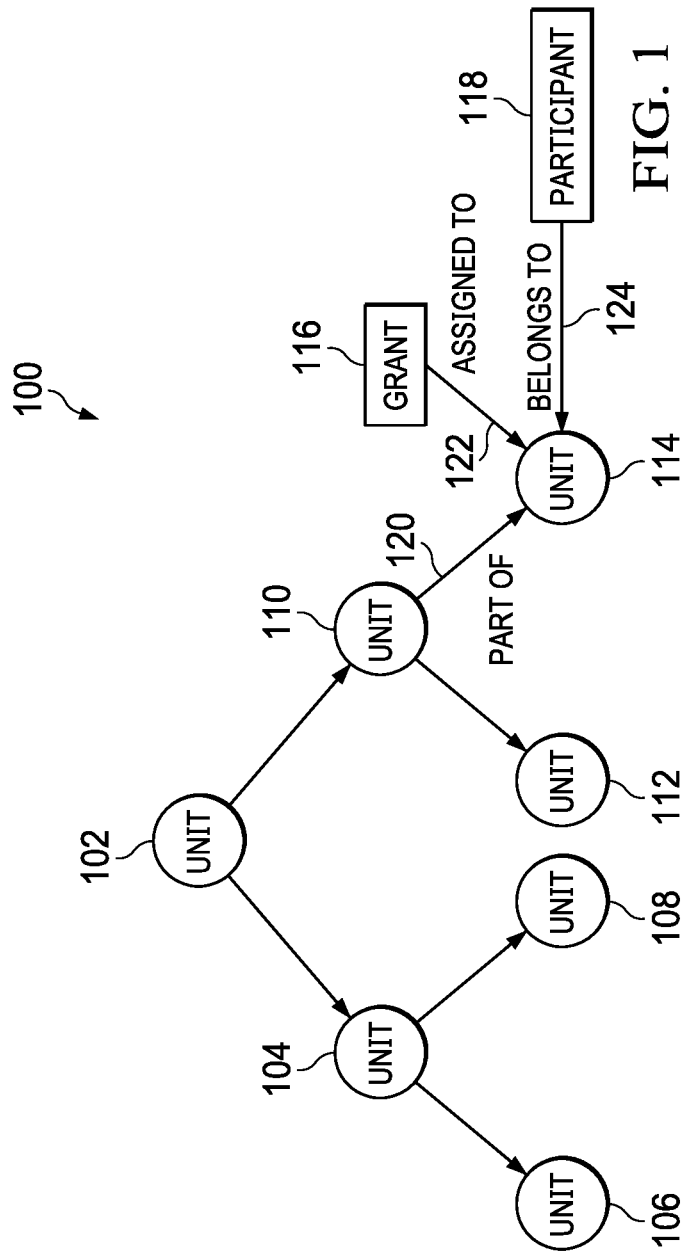
FIG. 1 is a block diagram of a novel graph database design in accordance with an illustrative embodiment.

The illustrative embodiments recognize and take into account that an organization has information to distribute among members of the organization. The types of information may vary in regard to who has a need to access the information. If all information is distributed to each and every person in the organization, a number of problems may arise.

The illustrative embodiments recognize and take into account that an employee who receives too much information may be less productive. The employee may miss important information within a thicket of documents distributed to the employee but will little or no value or relevance to the work in which the employee is engaged.

The illustrative embodiments recognize and take into account that security and confidentiality considerations may demand that some documents are not distributed to all employees. Indeed, some documents may require distribution only to selected employees such as managers or employees assigned to a work unit engaged in highly sensitive areas.

The illustrative embodiments recognize and take into account that an organization may have employees in a parent company and also in a number of subsidiary companies. The organization may have a number of compliance policies that it needs to distribute and have employees view and accept. One compliance policy may need acceptance and approval by all employees in the organization including all of the number of subsidiary companies. Another compliance policy may need to be viewed and accepted by only employees in one of the subsidiary companies.

The illustrative embodiments recognize and take into account that a flexible graph database provides for dynamic data relationships that create a mechanism to dynamically define new and existing relationships via metadata. The flexible graph database may dynamically adjust a node's relationship to another node based on the node's property value. A flexible graph database may have advantages in identifying individuals to receive certain documents and to prevent distribution of certain documents to those employees that have no need for the documents.

The illustrative embodiments recognize and take into account that a flexible graph database may have relationship metadata updates that are automatically consumed by the graph database. The flexible graph database may then update itself accordingly using rules in the metadata. In addition, this mechanism may allow a node to be linked to another node in the graph database dynamically based on a node's property value. If the value changes, then the linkage between the nodes will be updated.

The illustrative embodiments recognize and take into account that a flexible graph database may define relationships based on attributes of nodes. Such relationships based on attributes and nodes may be encapsulated in an object linked with a document to be distributed in the organization. In this manner, the illustrative embodiments recognize and take into account that an object linked with a document to be distributed may be used to generate a list of recipients provided by a traversal of a flexible graph database in which only persons needing the document may be identified. Moreover, the illustrative embodiments recognize and take into account that the list of recipients may be generated within the flexible graph itself.

The illustrative embodiments recognize and take into account that a flexible graph database may provide dynamic assignments of nodes based on metadata linked with the nodes and that metadata may be stored in an object linked with a document to be distributed. Furthermore, a graph database reactor may listen to changes so that an attribute or a metadata change in the object linked with the document may trigger a change in the composition of the object so that a list of employees generated by the object will be current.

As used herein, the term "unit" refers to a fundamental grouping of participants and/or grants within the structure. An example, an employee role may be a unit. The employee role (unit) may be a grouping of associates (participants) who are employees of a company in a human resources structure. Documents to be distributed may be attached to units.

As used herein, the term "participant" is data that represents a type of actor in the structure that has a relationship to a unit. The relationship can be direct or indirect. As an example, an associate may belong to a role unit indirectly via a position held by the associate.

As used herein, the term "grant" refers to an object that has a relationship to a unit and is applied to all of the participants of the unit. As an example, authorization grants may be assigned to a role unit and applied to all associates in the role.

As used herein, the term "relationship type" refers to a property between two objects in the structure that defines the relationship itself. For example, a grant has an "assigned to" relationship type with a unit. In another example, a unit may have a "part of" relationship type with another unit. As used herein an "entity" is a set of data that defines an object, a person, or properties or relationships of the object or person.

A unit may be composed of entities. An entity may be a unit in some instances, or may be a sub-unit in other instances.

FIG. 1 is a block diagram of a novel graph database design in accordance with an illustrative embodiment. Structure 100 is an example of the novel graph databases described here and elsewhere herein. Structure 100 is stored solely on a non-transitory computer recordable storage medium and only maintained by a computer. Thus, the illustrative embodiments improve data distribution on a computer, both in terms of the kind and quality of data distributed. The illustrative embodiments also provide for automatic maintenance of the distribution list by the computer.

In order to better understand structure 100, certain terms are now defined. As used herein, the term "structure" refers to a construct that maintains and defines relationships between units. Structure 100 may be considered an improvement of a graph database. Structure 100 may store information about a particular organization. For example, a structure could be a human resources structure, a role structure, or others. Stated succinctly, structure 100 is a collection of units, participants, and grants with defined relationships between one another. A structure may be, but does not have to be, hierarchical in structure.

As used herein, the term "practitioner group" refers to a fundamental grouping of participants within the structure based upon practitioner type. An example, an employee may be assigned to a number of employee authorization grants and may be authorized as a role in a particular position.

As used herein, the term "responsibilities" are defined as grants to a role unit. Therefore a responsibility refers to an object that has a relationship to a practitioner group and may be applied to all of the participants of the practitioner group. As an example, a grant assigned to a practitioner group may be defined by a responsibility group. The responsibility group may comprise all or part of the practitioner group apply to all practitioner group may have a human resources grant assigned to a practitioner group and applied to all associates in the role.

As used herein a "data scoping structure" may be a flexible graph structure defining a responsibility group structure. As used herein a "data scoping object" may be an object assigned to a document that links a group to at least one grant and at least one node through a number of edges. As used herein "responsibility groups" are defined as participants of a criteria-based unit in the structure.

Returning to FIG. 1, structure 100 includes units, such as unit 102, unit 104, unit 106, unit 108, unit 110, unit 112, and unit 114. More or different units may be present and the units may have different relationships than those shown. Units are akin to nodes in a typical graph database, but have other properties such as metadata, and may be of completely new types such as grants and participants. Thus, for example, grant 116 is a type of unit and participant 118 is a type of unit.

FIG. 1 also shows edges, as indicated by the various arrows between units, including grant 116 and participant 118. Edges depict relationships between the nodes and have labels. For example, edge 120 has a label "part of", edge 122 has a label "assigned to", and edge 124 has a label "belongs to". These edges define the relationship of unit 110 to unit 114, of grant 116 to unit 114, and participant 118 to unit 114.

Structure 100 observes certain ground rules. For example, unit to unit relationships are always at least a "part of" relationship. In another example, grant to unit relationships are always at least an "assigned to" relationship. In another example, relationships between nodes may be bi-directional. Thus, for example, a grant to unit and a unit to grant relationship are both valid.

Participant 118 is a type of unit that typically represents an actor. Participant 118 may be directly related to a unit (an employee, for example) or may be indirectly related to a unit (an associate via their position is related to a human resources unit, for example). In this scenario, the position is the direct participant, but the actor is the employee.

The types of grants can be different depending on the structure. For example, an authorization grant may be related to a role structure. A time-off grant may be related to a work structure.

Figure 2:
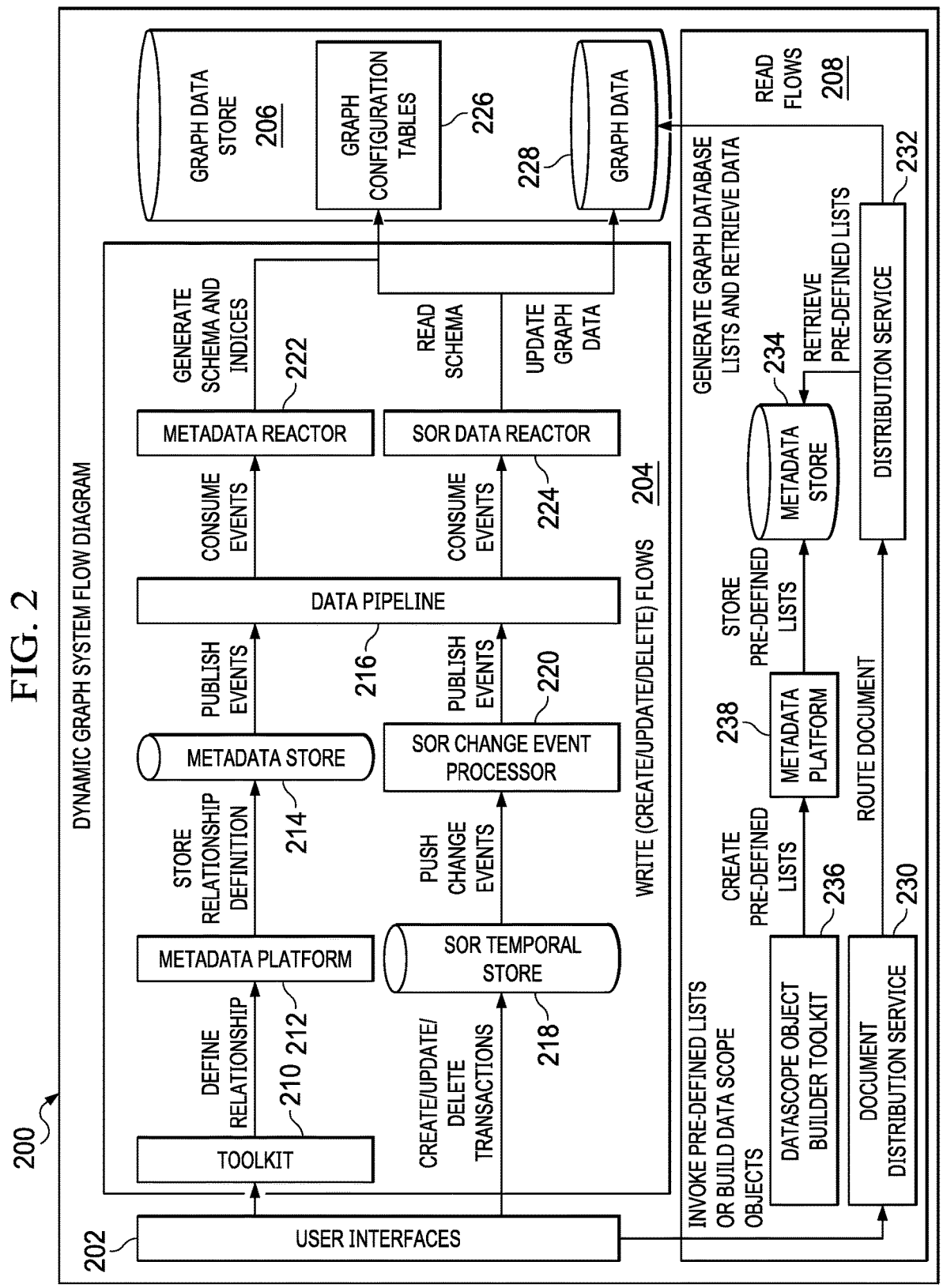
FIG. 2 is a block diagram of a specific example of a novel dynamic graph system with a datascope object builder in accordance with an illustrative embodiment.

FIG. 2 depicts a block diagram of an illustrative example of a dynamic graph system with a data scoping object builder in accordance with an illustrative embodiment. Dynamic graph system 200 may be characterized as a dynamic graph system flow diagram. Dynamic graph system 200 shows both systems and actions in the design and operation of a structure, as defined above, and as described with respect to FIG. 1 through FIG. 6. Dynamic graph system 200 may operate in conjunction with a data processing system such as data processing system 1100 in FIG. 11.

Block diagram 200 includes four main sections: user interfaces 202, write flows 204, graph data store 206, and read flows 208. User interfaces 202 may be typical user interfaces, such as a keyboard, mouse, graphical user interface (physical display), touch screen, voice interaction, and any other suitable interface for interacting with the computer. User interfaces 202 receive user input, including design of structure traversals, design of the structure, and/or data input, and/or metadata input. User interfaces 202 are used to create flows, that is create, update, and delete flows, as shown in write flows 204. In turn, flows interact with graph data store 206 for the storage and manipulation of the structure. Graph data store in turn is also accessed by user interfaces 202 via read flows 208.

Figure 3:
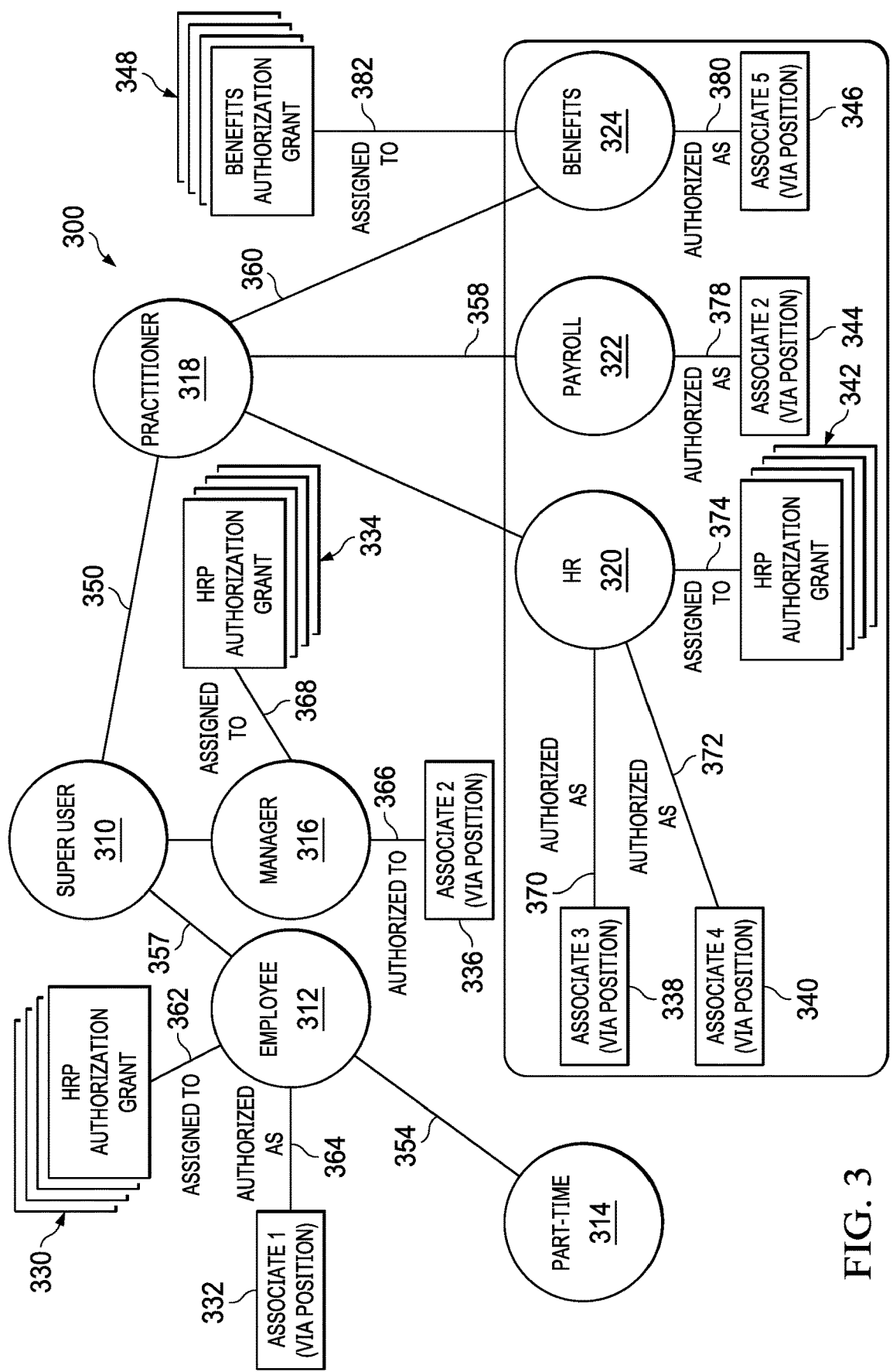
FIG. 3 is a diagram of a role structure defining practitioner types in a data processing system in accordance with an illustrative embodiment.
Figure 4:
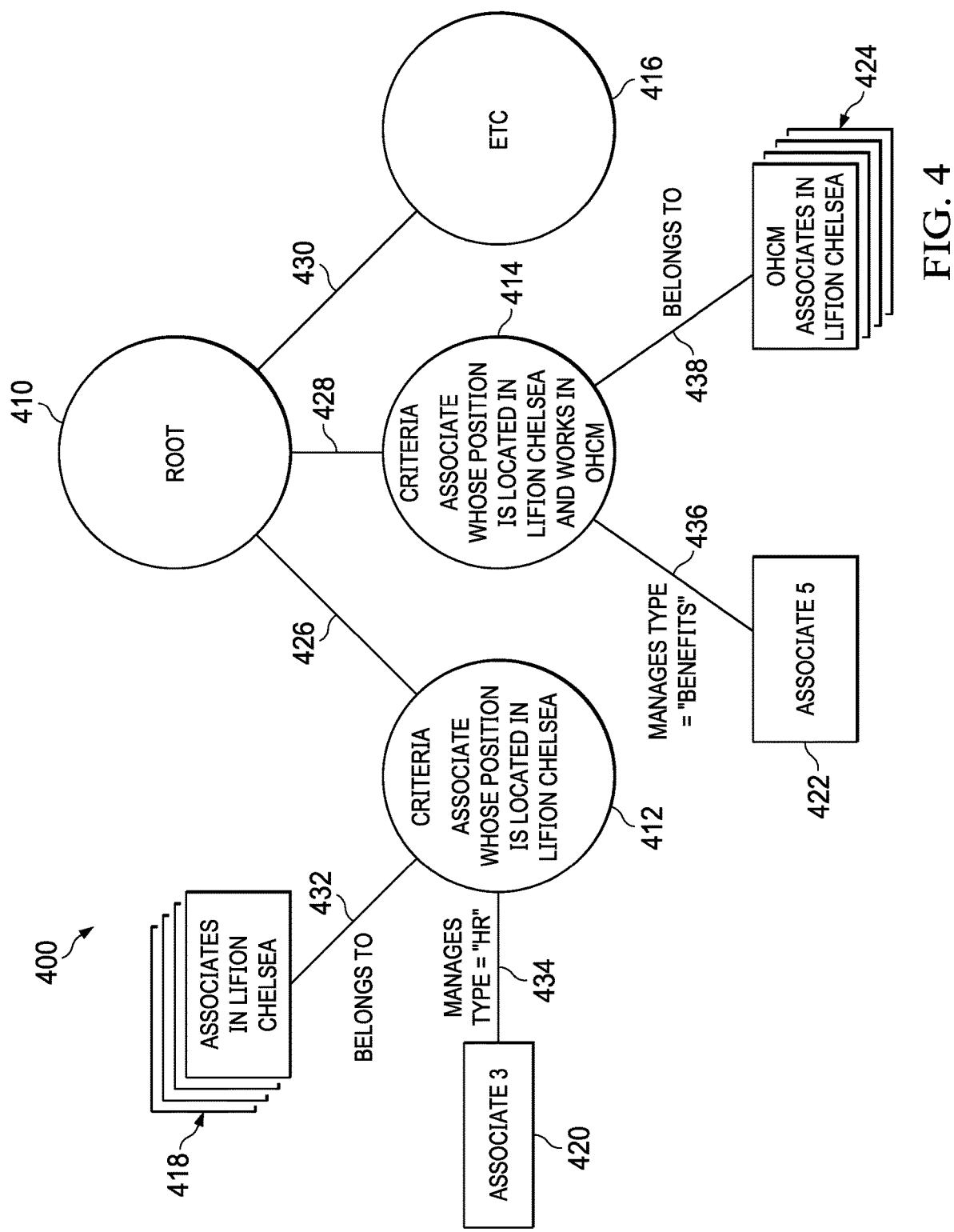
FIG. 4 is a diagram of responsibility group structure in a data processing system in accordance with an illustrative embodiment.

For write flows 204, user interfaces 202 interact with graph relationship designer toolkit 210. Examples of user interfaces for such a toolkit are shown in FIG. 3 and FIG. 4. Graph relationship designer toolkit 210 defines relationships among units in the structure. Write flows 204 also includes metadata platform 212. Metadata platform 212 stores relationship definitions to metadata store 214. In turn, metadata store 214 publishes events to data pipeline 216.

Additionally, for write flows 204, user interfaces 202 also is used to create, update, and/or delete transactions for the various units in the structure to SOR temporal store 218. Again, SOR stands for "system of record." In turn, SOR temporal store 218 pushes change events to SOR change event processor 220, which may be software executed by hardware or may be hardware alone. Like metadata store 214, SOR change event processor 220 publishes events that it generates to data pipeline 216.

Whatever events are published, data pipeline 216 consumes events and provides them to metadata reactor 222 and SOR data reactor 224. Reactors are software programs, or hardware alone, which are programmed to take action in response to events or reactors. Metadata reactor 222 generates schema and indices, and provides them to graph configuration tables 226 in graph data store 206.

The front-end drag and drop designer application, such as described above, generates metadata that defines the relationship (two nodes and an edge) that will be used to form the graph. Examples, using FIG. 2 include Associate Occupies Position or Grants Assigned to Unit. The metadata reactor consumes this relationship metadata and converts it into a proper graph database schema and custom indices. These results will be used by the SOR data reactor to build and maintain the graph data.

SOR data reactor 224 reads schema and provides the result to graph configuration tables 226. SOR data reactor 224 also updates graph data and stores updates in graph data 228. Once metadata reactor 222 generates the graph schema, SOR data reactor 224 will start listening to the relevant SOR change events and maintain the graph data as needed. For example, if there is a new record for an associate being created in SOR, that event will trigger a message to the SOR reactor. The SOR reactor will understand that a new associates record has just been created, and it will build the "Associate Occupies Position" relationship and link that relationship to its proper place in the graph.

Attention is now turned to read flows 208. Again, user interfaces 202 are used to invoke pre-defined lists or to build dynamic lists. These lists are provided to document distribution service 230. Document distribution service 230 routes graph data lists to document distribution service 232. In turn, document distribution service 232 accesses metadata store 234, which may be the same or different than metadata store 214 from the write flows. Document distribution service 232 retrieves lists generated by data scoping object builder 236.

In addition, when a user desires to distribute a document, datascope object builder 236 may be used to create lists which may be provided to metadata platform 238. Metadata platform 238, in turn may store pre-defined lists which are provided to metadata store 234 by datascope object builder 236.

Returning to document distribution service 232, this service generates lists based on data scoping objects and retrieves data to and from graph data 228. Retrieved data and/or query results are stored, provided to a user via user interfaces 202, or both, in a manner similar to that described above.

Figure 5:
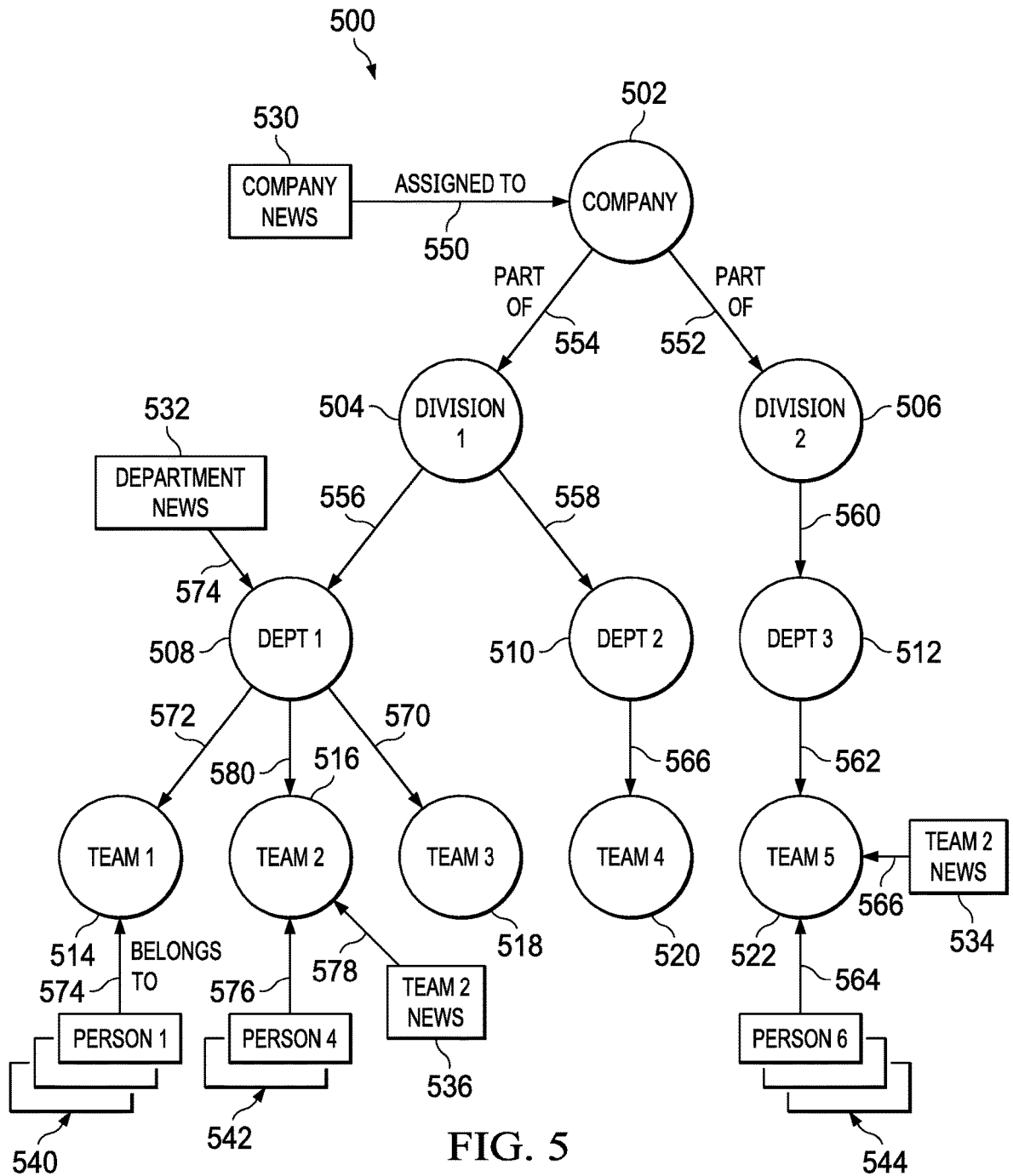
FIG. 5 is a diagram of news content distribution using flexible structures in a data processing system in accordance with an illustrative embodiment.
Figure 6:
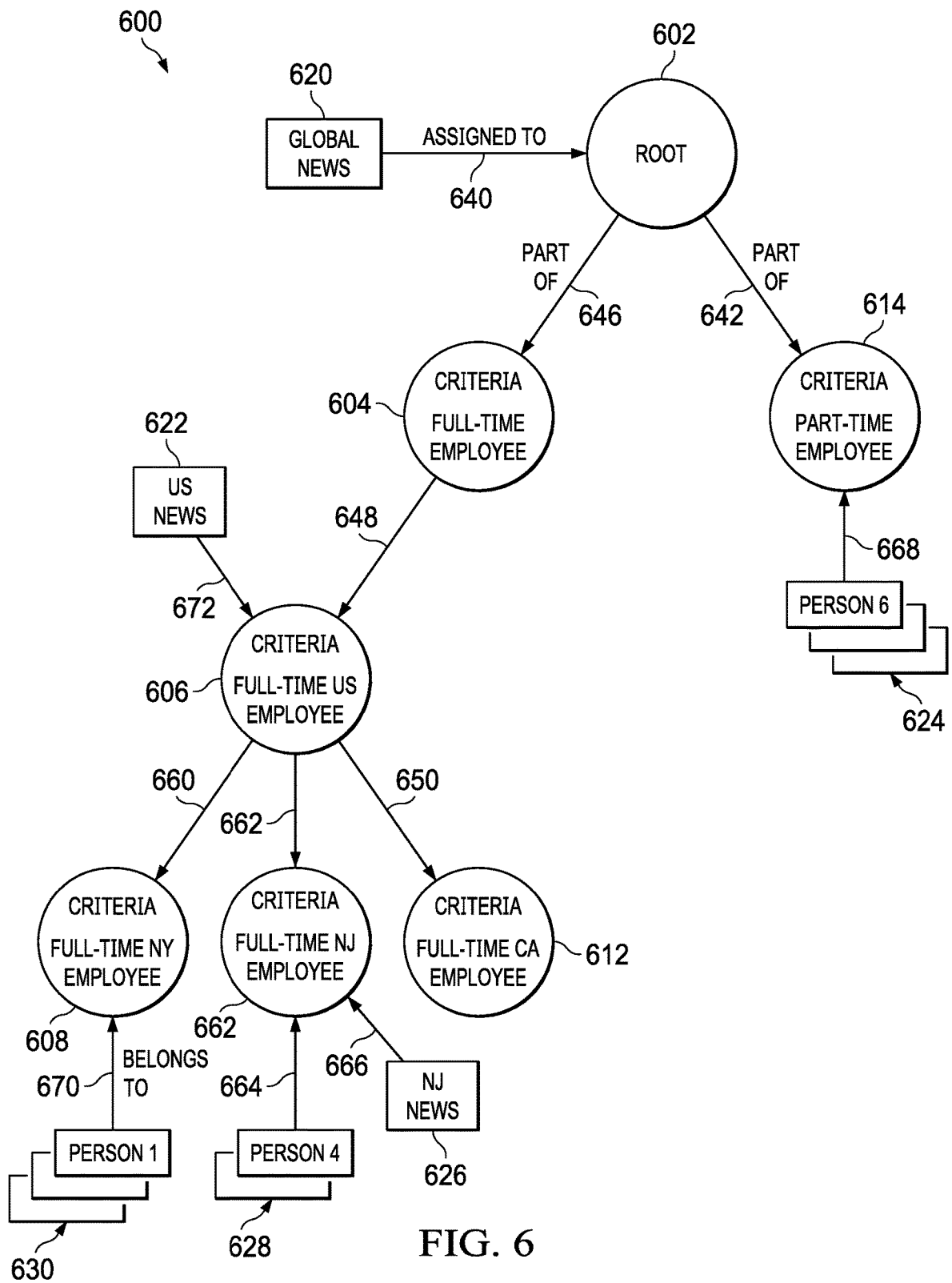
FIG. 6 is a diagram of news content distribution using criteria-based structures in a data processing system in accordance with an illustrative embodiment.

In one illustrative example, one or more technical solutions are present that overcome a technical problem with sending documents only to individuals who should receive the documents. Dynamic graph system 200 distributes documents in accordance with a list formed from a data scoping object linked with the document in a data processing system. Dynamic graph system 200 distributes documents in accordance with a list of documents, each document assigned a data scoping object that links a group to at least one grant and at least one node through a number of edges in a data processing system such as data processing system 1100 in FIG. 11. The data scoping object may be based on a number of edges. By way of example, such edges may be "assigned to", "part of", and "belongs to" as illustrated in FIG. 5 and FIG. 6. The lists may be retrieved by document distribution service 232. Datascope object builder 236 may create lists and provide the lists to metadata platform 238. Metadata platform 238 may store pre-defined lists provided by datascope object builder 236. As a result, the foregoing technical solutions may provide a technical effect in that documents may be distributed more efficiently because the data processing system uses less resources and uses resources more efficiently. Specifically, the data processing system using dynamic graph system 200 and datascope object builder 236 causes electronic delivery of documents to be made only to those individuals who should receive the documents. In particular, datascope object builder 236 transforms a data processing system such as data processing system 1100 into a special purpose data processing system as compared to currently available data processing systems that do not have datascope object builder 236 operating in a dynamic graph system such as dynamic graph system 200.

FIG. 3 is a diagram of a role structure defining practitioner types in a data processing system in accordance with an illustrative embodiment. Structure 300 may be a role structure defining practitioner types. Super user node 310 may be connected to employee node 312 by edge 352, to manager node 316 by edge 349, and to practitioner node 318 by edge 350.

Employee 312 may be connected to a number of employee authorization grants 330 by "assigned to" edge 342 and to "Associate 1" by "authorized by" edge 364. Manager node 316 may be connected to manager authorization grants 334 by "assigned to" edge 368 and to "Associate 2" by "authorized as" edge 366. Practitioner node 358 may be connected to a number of practitioner types. In the illustrative example, the following types are shown: human resources (HR) 320, payroll 322, and benefits 324.

A practitioner group may be formed such as practitioner group 390 comprising human resources 320, payroll 322, and benefits 324. Within practitioner group 390, human resources may be connected to "Associate 3" 338 by "authorized as" edge 270, to "Associate 4" 340 by "authorized as" edge 372, and to a number of HRP authorization grants 342 by "assigned to" edge 374. Payroll 322 may be connected to "Associate 2" by "authorized as" edge 378. Benefits 324 may be connected to "Associate 5" by "authorized as" edge 380 and to a number of benefits authorization grants 348 by "assigned to" edge 382. Datascope object builder 236 in FIG. 2 may create data scoping objects based on edges such as "authorized as" edge 372 and "assigned to" edge 382.

FIG. 4 is a diagram of a responsibility group structure in accordance in a data processing system with an illustrative embodiment. In the illustrative embodiment, responsibility group structure 400 comprises root 410 connected to a first criteria unit node 412 by edge 426, to second criteria unit node 414 by edge 428 and to node 416 by edge 420. Node 416 represents any number of additional criteria unit nodes that may be added to root 410.

First criteria unit node 412 is connected to a number of "Associates in Lifion Chelsea" 418 by "belongs to" edge 432 and to "Associate 3" by "manages type=HR" edge 434. Second criteria unit node 414 is connected to "Associate 5" 422 by "manages type=benefits" edge 436 and to a number of OHCM Associates in Lifion Chennai" 424 by "belongs to" edge 438. Datascope object builder 236 in FIG. 2 may create data scoping objects based on edges such as "belongs to" edge 432, "manages type=HR" edge 434, "manages type=benefits" edge 436 and "belongs to" edge 438.

FIG. 5 is a diagram of news content distribution in accordance with an illustrative embodiment. Responsibility group structure 500 depicts division 1 504 connected to company 502 by "part of" edge 554. Division 2 506 is connected by "part of" edge 552 to company 502. Department 1 508 is connected by "part of" edge 556 to Division 1 504. Department 2 510 is connected by "part of" edge 558 to division 1 504. Team 1 514 is connected by "part of" edge 572 to department 1 508. Team 2 516 is connected by "part of" edge 580 to department 1 508. Team 3 518 is connected by "part of" edge 570 to department 1 508. Person 1 540 is connected by "belongs to" edge 574 to team 1 514. Person 4 542 is connected by "part of" edge 576 to team 2 516. Department 2 510 is connected by "part of" edge 558 to division 1 504. Team 4 520 is connected by "part of" edge 566 to department 2 510. Department 3 512 is connected by "part of" edge 560 to division 2 506. Team 5 522 is connected by "part of" edge 562 to department 3 512. Person 6 544 is connected by "part of" edge 564 to team 5 522.

Company news 530 may be a document that is to be distributed throughout responsibility group structure 500. Therefore, company news 530 is assigned to company 502. Person 1 540, person 4 542, and person 6 544 will receive company news 530. Department news 532 is connected by "assigned to" edge 574 to depart 1 508. Person 1 540 and person 4 542 will receive department news 532. Team news 2 536 is connected by "assigned to" edge 566 to team 2 516. Person 4 542 will receive team 2 news 536. Team 2 news 534 is connected by "assigned to" edge 566 to team 5 522. Therefore, person 6 544 will receive team 2 news 534. Thus, in the forgoing illustrative embodiment, the flexibility of "assigned to" edges is shown. Moreover, a list of documents within a graph such as responsibility group structure 500 may be generated. Datascope object builder 236 in FIG. 2 may create data scoping objects based on edges such as "assigned to" edge 574 and "part of" edge 564 to be attached to each document for delivery. Therefore, each document in such a list may have attached a data scoping object based on "assigned to" edges and "part of" edges for delivery of the document. In such manner, each document will be delivered only to those to whom a path has been assigned.

FIG. 6 is a diagram of news content distribution using criteria-based structures. Criteria based structure 600 has root 602. Full-time employee criteria 604 is connected by "part of" edge 646 to root 602. Part-time employee criteria 614 is connected by "part of" edge 642 to root 602. Full-time US employee criteria 606 is connected by "part of" edge 648 to full-time employee criteria 604. Full-time NY employee criteria 608 is connected by "part of" edge 660 to full-time US employee criteria 606. Full-time NJ employee 610 is connected by "part of" edge 662 to full-time US employee criteria 606. Full-time CA employee 612 is connected by "part of" edge 650 to full-time US employee criteria 606. Person 1 630 is connected by "belongs to" edge 670 to full-time NY employee criteria 608. Person 4 628 is connected by "part of" edge 664 to full-time NJ employee criteria 662. Person 6 624 is connected by "part of" edge 668 to part-time employee criteria 614.

Global news 620 may be connected to root 602 by "assigned to" edge 640. Therefore, person 1 630, person 4 628, and person 6 624 will receive global news 620. US news 622 is connected by "assigned to" edge 672 to full-time US employee criteria 606. Therefore, person 1 630 and person 4 628 will receive US news 622. NJ news 626 is connected by "assigned to" edge 666 to full-time NJ employee criteria 610. Therefore, person 4 628 will receive NJ news 626. Thus, in the forgoing illustrative embodiment, the flexibility of bot "assigned to" edges and "part of" edges is shown. Moreover, a list of documents within a graph such as responsibility group structure 600 may be generated. Datascope object builder 236 in FIG. 2 may create data scoping objects based on edges such as "assigned to" edge 672 and "part of" edge 668 to be attached to each document for delivery. Therefore, each document in such a list may have attached a data scoping object based on "assigned to" edges, "part of" edges, and "belongs to" edges for delivery of the document. In such manner, each document will be delivered only to those to whom a path has been assigned in the criteria based structure 600.

Figure 7:
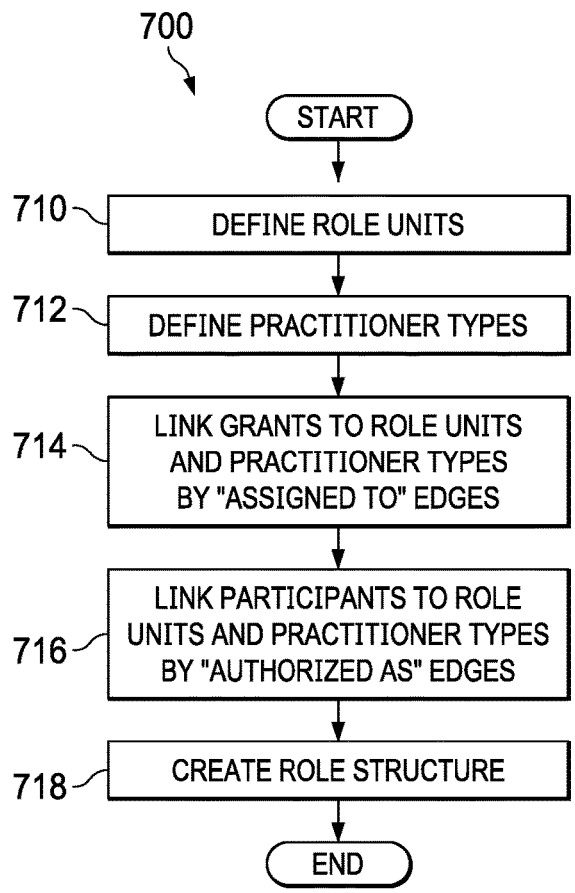
FIG. 7 is a flowchart of a process for creating a role structure defining practitioner types in a data processing system in accordance with an illustrative embodiment.

FIG. 7 is a flowchart of a process for creating a role structure defining practitioner types in a data processing system. Process 700 may be configured as program code such as program code 1118 stored on computer readable storage media such computer readable storage media 1124 or computer readable signal media 1126 in FIG. 11. Furthermore, process 700 may be part of datascope object builder 236 in FIG. 2. Process 700 begins by defining role units (step 710). Practitioner types are defined (step 712). Grants are linked to role units and practitioner types by "assigned to" edges (step 714). Participants are linked to role units and practitioner types by "authorized as" edges (step 716). The role structure is created (step 718).

Figure 8:
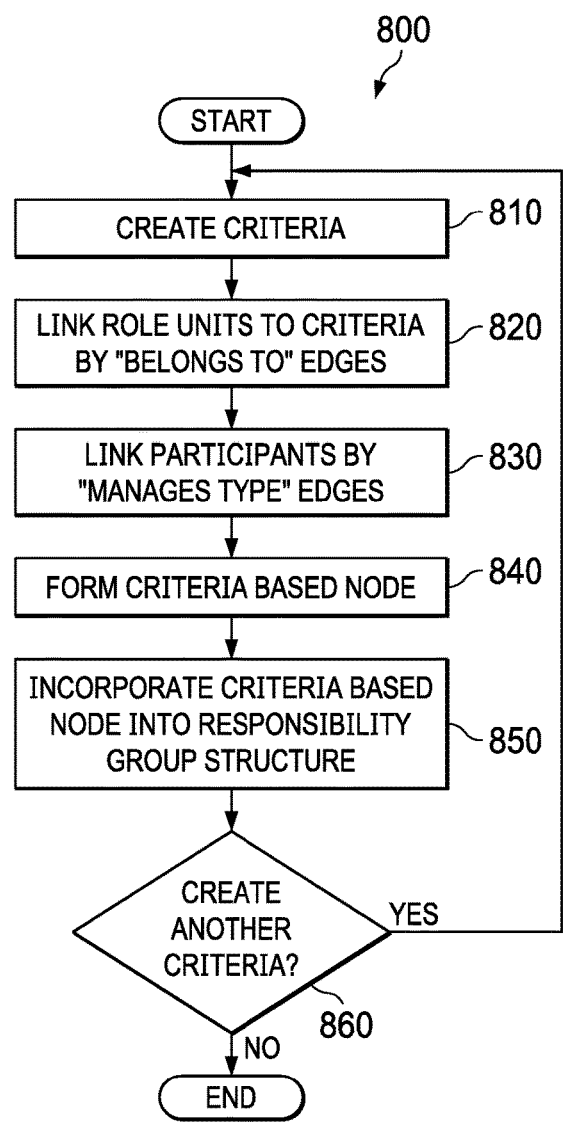
FIG. 8 is a flowchart of process for creating a responsibility group structure in a data processing system, in accordance with an illustrative embodiment.

FIG. 8 is a flowchart of process for creating a responsibility group structure in a data processing system, in accordance with an illustrative embodiment. Process 800 may be configured as program code such as program code 1118 stored on computer readable storage media such computer readable storage media 1124 or computer readable signal media 1126 in FIG. 11. Furthermore, process 800 may be part of datascope object builder 236 in FIG. 2. Process 800 starts and creates a criteria (step 810). Roles units are linked to the criteria by "belongs to" edges (step 820). Participants are linked to the criteria by "manages type" edges (step 830). A criteria based unit node is formed from the role units and the participants (step 840). The criteria node is incorporated into the responsibility group structure (step 850). A determination is made whether there is another criteria node to create (step 860). If so, process 800 goes to step 810, and if not, process 800 ends.

Figure 9:
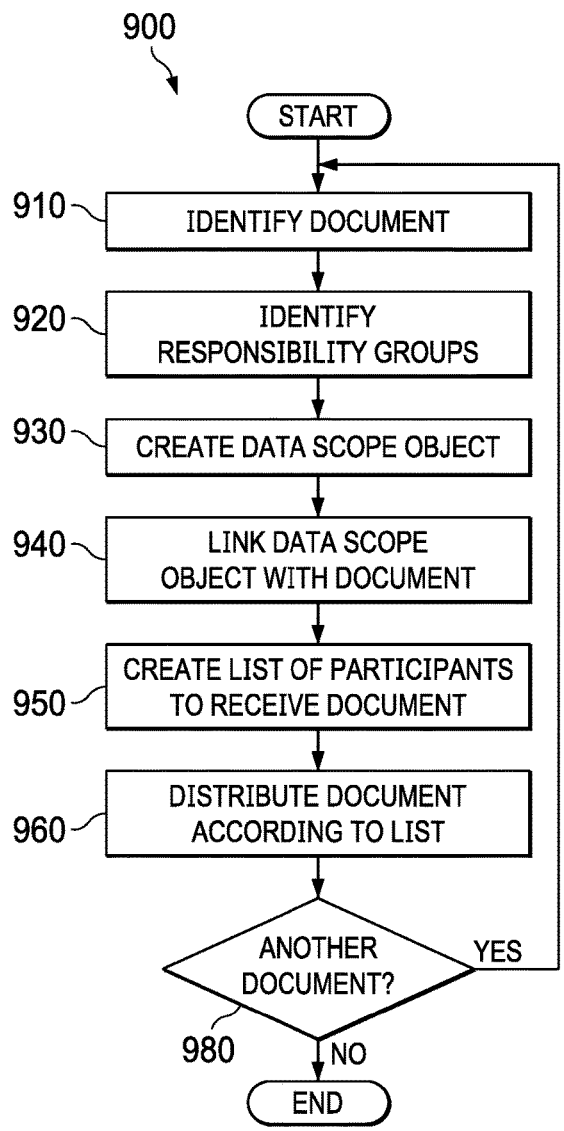
FIG. 9 is a flowchart of a process for distributing a document in accordance with a list formed from a data scoping object linked with the document in a data processing system, in accordance with an illustrative embodiment.

FIG. 9 is a flowchart of process for distributing a document in accordance with a list formed from a data scoping object linked with the document in a data processing system, in accordance with an illustrative embodiment. Process 900 may be configured as program code such as program code 1118 stored on computer readable storage media such computer readable storage media 1124 or computer readable signal media 1126 in FIG. 11. Furthermore, process 900 may be part of datascope object builder 236 in FIG. 2. Process 900 starts and identifies a document (910). The document may be a document that has not been assigned a data scoping object to control distribution of the document. Responsibility groups that have a need to receive the document are identified (step 920). A data scoping object is created for the document by linking a responsibility group to at least one grant and at least one criteria based unit (step 930). The data scoping object is linked with the document (step 940). The data scoping object is used to create a list of recipients for the document. The list of recipients comprises all participants connected to the responsibility groups and at least one grant by the criteria based units (step 950). The document is distributed according to the list (step 960). A determination is made whether there is another document to be processed (step 980). If there is another document, process 900 goes to step 910, and if not, process 900 ends.

Figure 10:
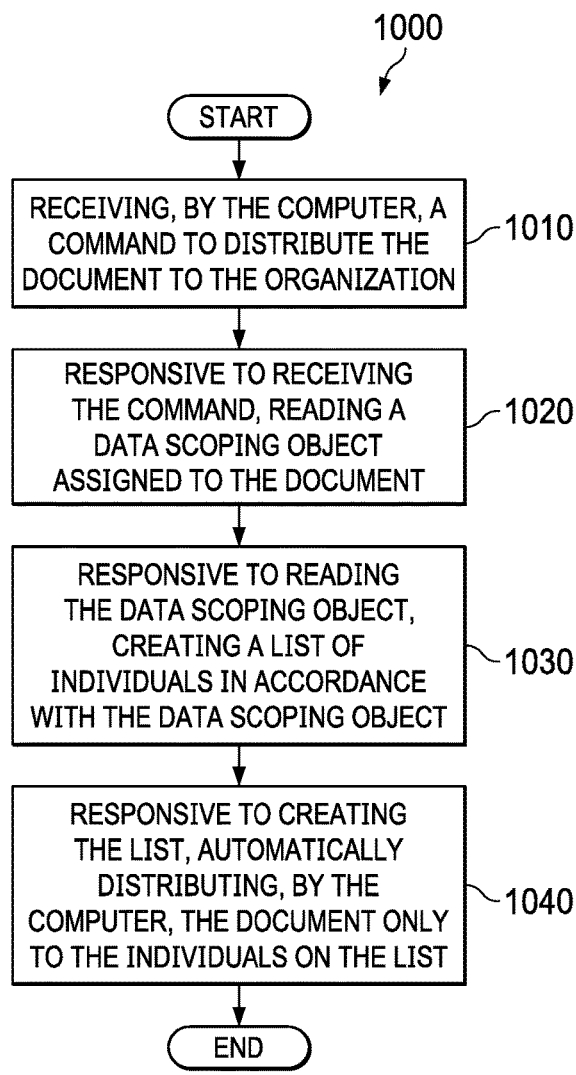
FIG. 10 is a flowchart of process for distributing a document in accordance with a list formed from a data scoping object linked with the document in a data processing system, in accordance with an illustrative embodiment.

FIG. 10 is a flowchart of process for distributing a document in accordance with a list formed from a data scoping object linked with the document in a data processing system, in accordance with an illustrative embodiment. Process 1000 may be configured as program code such as program code 1118 stored on computer readable storage media such computer readable storage media 1124 or computer readable signal media 1126 in FIG. 11. Furthermore, process 1000 may be part of datascope object builder 236 in FIG. 2. Process 1000 may be a computer-implemented method of improving data distribution in an organization by a computer. Process 1000 starts and receives, by the computer, a command to distribute the document to the organization (step 1010). Responsive to receiving the command, the computer reads a data scoping object assigned to the document (step 1020). Responsive to reading the data scoping object, the computer creates a list of individuals in accordance with the data scoping object (step 1030). Responsive to creating the list, the computer automatically distributes the document only to the individuals on the list.

Figure 11:
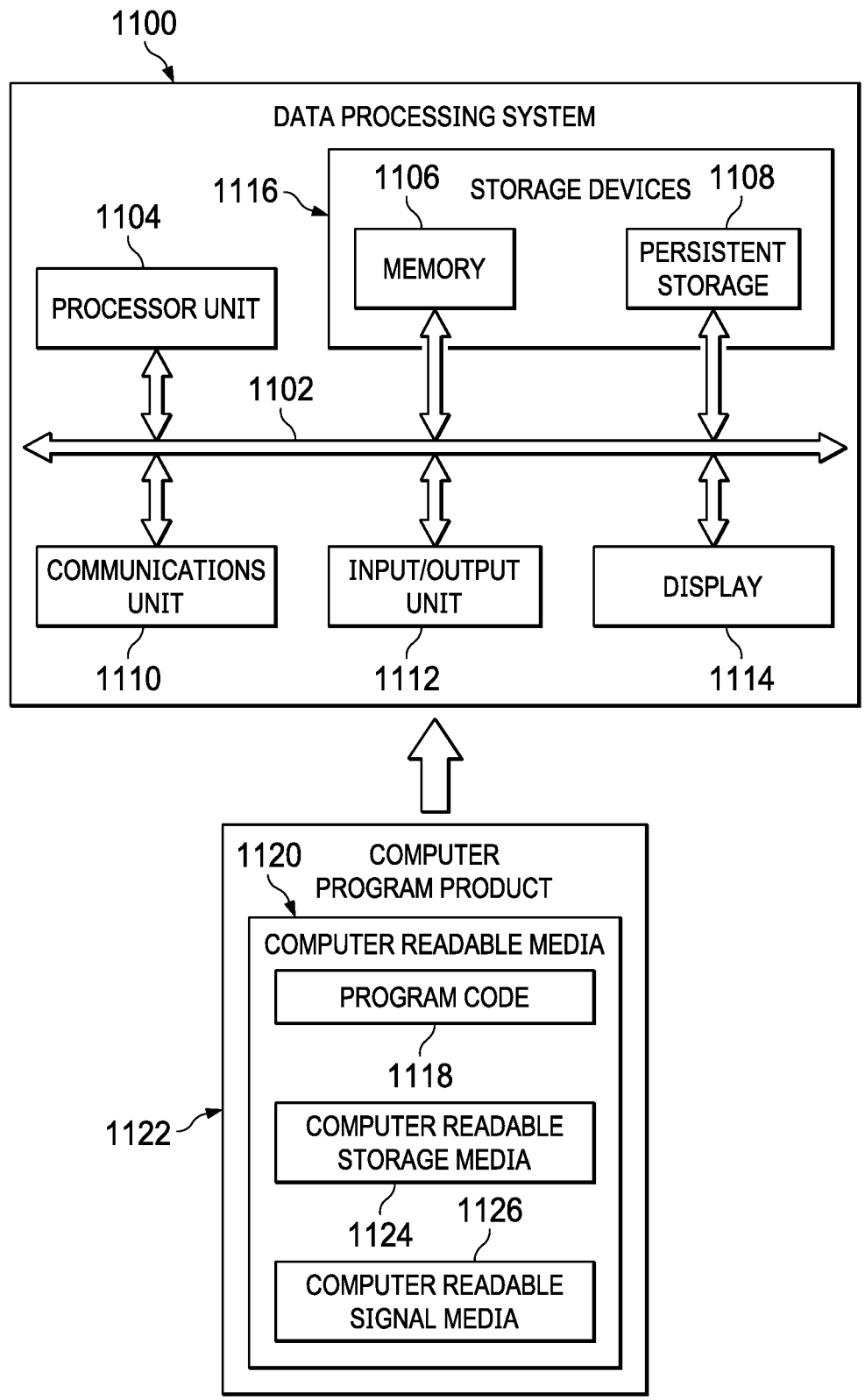
FIG. 11 is a block diagram of a data processing system, in accordance with an illustrative embodiment.

FIG. 11 is a block diagram of a data processing system depicted in accordance with an illustrative embodiment. Data processing system 1100 is an example of a computer system, as described with respect to FIG. 1 through FIG. 10.

In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software code for carrying out process 700 of FIG. 7, process 800 of FIG. 8, process 900 of FIG. 9, and process 1000 of FIG. 10. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components, in addition to or in place of those illustrated for data processing system 1100. Other components shown in FIG. 11 can be varied from the illustrative examples shown. The different embodiments may be implemented using any hardware device or system capable of running program code 1118.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

As used herein, the term "server computer" is any computer which operates in the role of a server, whether or not the computer is configured specifically to operate as a "server." As used herein, the term "client computer" is any computer which operates in the roll of a client, whether or not the computer is configured specifically to operate as a "client" or a "workstation."

What is claimed is:

1. A computer-implemented method of improving data distribution in an organization by a computer, the method comprising:

receiving, by a document distribution service of a read flow section of the computer, a command to distribute a document to the organization;

responsive to receiving the command, reading, by the document distribution service, a data scoping object assigned to the document;

responsive to reading the data scoping object, creating a list of individuals in accordance with the data scoping object; and responsive to creating the list, automatically distributing, by the computer, the document only to the individuals on the list including retrieving the document from a graph data store, wherein the document was updated with graph data from a write flow section of the computer and the write flow section generates schema and indices that are generated by a metadata reactor by consuming and converting relationship metadata provided to a system of record temporal store that pushes change events to a system of record processor that publishes events it generates to a data pipeline, stored in graph configuration tables of the graph data store and read by a system of record data reactor listening for relevant system of record change events, maintaining graph data, and updating graph data.

2. The computer-implemented method of claim 1, further comprising:

storing, by the computer, a document as part of a structure, the document linked a data scoping object defining one or more practitioner types and one or more responsibility groups.

3. The computer-implemented method of claim 1, wherein reading the data scoping object assigned to the document further comprises identifying one or more participants of a criteria based unit.

4. The computer-implemented method of claim 1, further comprising:

creating a flexible graph database having a number of practitioner groups connected by a number of responsibility grants to a number of responsibility groups.

5. The computer-implemented method of claim 3, further comprising creating a flexible graph database includes:

defining practitioner types by type designations connected by a number of edges to a number of positions and to a number of authorization grants.

6. The computer-implemented method of claim 4, wherein a first edge connecting a first type designation to a position is "authorized as".

7. The computer-implemented method of claim 4, wherein a second edge connecting a first type designation to a first authorization grant is "assigned to".

8. The computer-implemented method of claim 1, wherein a criteria based unit comprises a node connected to a position by a "manages" edge.

9. The computer-implemented method of claim 7, wherein a criteria based unit comprises a node connected to a responsibility group by a "belongs to" edge.

10. The computer-implemented method of claim 1, further comprising:
creating the data scoping object for the document on an interface that allows linking a responsibility group to at least one grant and at least one criteria-based node.

11. The computer-implemented method of claim 1 further comprising:
periodically traversing, by the computer, a structure for changes to data scoping objects assigned to documents, and automatically updating a changed data scoping object by linking the changed data scoping object with the document and deleting an old data scoping object.

12. A computer comprising:
a processor; and
a non-transitory computer recordable storage medium storing program code, which when executed by the processor, causes the computer to receive, by a document distribution service of a read flow section of the computer, a command to distribute a document to an organization;
responsive to receiving the command, to read a data scoping object assigned to the document;
responsive to reading the data scoping object, to create a list of individuals in accordance with the data scoping object; and
responsive to creating the list, automatically to distribute, by the computer, the document only to the individuals on the list including retrieving the document from a graph data store,
wherein the document was updated with graph data from a write flow section of the computer and the write flow section generates schema and indices that are
generated by a metadata reactor by consuming and converting relationship metadata,
provided to a system of record temporal store that pushes change events to a system of record processor that publishes events it generates to a data pipeline,
stored in graph configuration tables of the graph data store and
read by a system of record data reactor
listening for relevant system of record change events,
maintaining graph data, and
updating graph data.

13. The computer of claim 12, further comprising:
program code, which when executed by the processor, causes the computer to create a flexible graph database having a number of practitioner groups connected by a number of responsibility grants to a number of responsibility groups; and
program code, which when executed by the processor, causes the computer to define practitioner types by type designations connected by a number of edges to a number of positions and to a number of authorization grants.

14. The computer of claim 12, further comprising:
program code, which when executed by the processor, causes the computer to store, by the computer, a document as part of a structure, the document linked to a data scoping object defining one or more practitioner types and one or more responsibility groups; and
program code, which when executed by the processor, causes the computer to read the data scoping object assigned to the document further comprises identifying one or more participants of a criteria based unit.

15. The computer of claim 12, wherein program code, which when executed by the processor, causes the computer to read the data scoping object assigned to the document further comprises; program code, which when executed by the processor, causes the computer to identify one or more participants of a criteria based unit.

16. The computer of claim 12, further comprising:
program code, which when executed by the processor, causes the computer to create the data scoping object for the document on an interface that allows linking a responsibility group to at least one grant and at least one criteria-based node.

17. A computer readable storage media storing program code, which when executed by a processor, performs a computer-implemented method of improving data distribution in an organization by a computer, the method comprising:
receiving, by a document distribution service of a read flow section of the computer, a command to distribute a document to the organization;
responsive to receiving the command, reading a data scoping object assigned to the document;
responsive to reading the data scoping object, creating a list of individuals in accordance with the data scoping object; and
responsive to creating the list, automatically distributing, by the computer, the document only to the individuals on the list including retrieving the document from a graph data store,
wherein the document was updated with graph data from a write flow section of the computer and the write flow section generates schema and indices that are
generated by a metadata reactor by consuming and converting relationship metadata,
provided to a system of record temporal store that pushes change events to a system of record processor that publishes events it generates to a data pipeline,
stored in graph configuration tables of the graph data store and
read by a system of record data reactor
listening for relevant system of record change events,
maintaining graph data, and
updating graph data.

18. The computer readable storage media of claim 17, further comprising:
stored program code, which when executed by the processor, causes a computer to create a flexible graph database having a number of practitioner groups connected by a number of responsibility grants to a number of responsibility groups; and
stored program code, which when executed by the processor, causes the computer to define practitioner types by type designations connected by a number of edges to a number of positions and to a number of authorization grants.

19. The computer readable storage media of claim 18, further comprising:
stored program code, which when executed by a processor, stores, by the computer, the document as part of a structure, the document linked to a data scoping object defining one or more practitioner types and one or more responsibility groups; and stored program code, which when executed by the processor, causes the computer to read the data scoping object assigned to the document further comprises identifying one or more participants of a criteria based unit.

20. The computer readable storage media of claim 19, further comprising:

stored program code, which when executed by a processor, creates the data scoping object for the document on an interface that allows linking a responsibility group to at least one grant and at least one criteria-based node.

* * * * *